(12) United States Patent
Davey

(10) Patent No.: US 6,173,727 B1
(45) Date of Patent: Jan. 16, 2001

(54) REMOTE CONTROL SPRINKLER CONTROL SYSTEM

(76) Inventor: Donald Davey, 1451 Churchill Downs Dr., Sandy, UT (US) 84092

( * ) Notice: Under 35 U.S.C. 154(b), the term of this patent shall be extended for 0 days.

(21) Appl. No.: 09/562,041

(22) Filed: May 1, 2000

Related U.S. Application Data

(63) Continuation of application No. 09/073,330, filed on May 6, 1998, now abandoned.

(51) Int. Cl.[7] .................................................. F16K 31/02
(52) U.S. Cl. ........................ 137/1; 251/129.04; 700/264
(58) Field of Search ........................ 137/1; 251/129.04; 239/69; 700/284

(56) References Cited

U.S. PATENT DOCUMENTS

| | | |
|---|---|---|
| Re. 31,023 | * 9/1982 | Hall, III . |
| 3,400,891 | * 9/1968 | Mattwell . |
| 3,653,595 | * 4/1972 | Greengard, Jr. et al. ............... 239/70 |
| 4,004,612 | * 1/1977 | Hummell, Jr. et al. . |
| 4,015,366 | * 4/1977 | Hall, III . |
| 4,101,786 | * 7/1978 | Ruggles et al. . |
| 4,185,650 | * 1/1980 | Neves et al. ............................. 239/69 |
| 4,209,131 | * 6/1980 | Barash et al. ........................... 239/69 |
| 4,244,022 | * 1/1981 | Kendall .................................. 700/284 |
| 4,760,547 | * 7/1988 | Duxbury ................................ 700/284 |
| 5,154,349 | * 10/1992 | Vaughn .................................. 239/69 |
| 5,381,331 | * 1/1995 | Mock et al. ........................... 700/284 |
| 5,479,338 | * 12/1995 | Ericksen et al. ..................... 700/284 |

* cited by examiner

Primary Examiner—Kevin Shaver
Assistant Examiner—Eric Keasel
(74) Attorney, Agent, or Firm—Morriss, Bateman, O'Bryant & Compagni

(57) ABSTRACT

A remote control system for automatic sprinkler control systems includes remote conductor lines for attachment to an automatic sprinkler control system, a remote processor for selectively applying power through one or more of the remote conductor lines so as to activate a portion of the automatic sprinkler control system, and a remote control for controlling the processor. The remote control system enables the use to operate the automatic sprinkler control system independent of the processor of the automatic sprinkler control system, and allows the user to conduct such control from a location adjacent to the actual sprinkler stations, as opposed to the central control unit of the automatic sprinkler control system.

22 Claims, 5 Drawing Sheets

REMOTE CONTROL SPRINKLER CONTROL SYSTEM

RELATED APPLICATIONS

The present application is a continuation of U.S. patent application Ser. No. 09/073,330, filed May 6, 1998, now abandoned.

FIELD OF THE INVENTION

The present invention relates to an improved sprinkler control system. More particularly, the present invention relates to a remote control sprinkler system which enables the remote activation of various stations of an automatic sprinkler system to permit the user to selectively activate and monitor a given sprinkler or sprinkler station without need to return to the central control unit of the automatic sprinkler system.

STATE OF THE ART

The use of automated sprinkler systems for lawns and the like has increased significantly over the past twenty-five years. In a typical sprinkler system, conduit is attached to a water supply source and is run under the lawn, garden, shrubs, etc. which is to be watered. The conduit terminates in a plurality of sprinkler heads which are disposed adjacent the surface to be watered. When watering is desired, the water is released through the conduit to the sprinkler heads.

Because the amount of water available at any moment is limited, most lawns of any size will have the sprinkler heads grouped into a plurality of stations. Each sprinkler head in a station will generally be connected to a common main conduit, and a valve will be disposed along the main conduit so that water to each of the sprinkler heads in the station may be controlled from a common point.

To ensure proper water pressure and flow, irrigation through sprinklers usually is limited to one or two stations at a time. On large residential lots, it is not uncommon to have six to eight different stations.

In the early use of sprinkler systems, a key was provided by which the user would turn each of the valves on and off in a desired sequence to ensure that each station received the desired amount of water. While such sprinkler systems were a significant improvement over hand watering, they still required the user to be present at the start and stop of each cycle. As will be apparent to those familiar with irrigation, being present to start and stop water from six to eight stations can consume a fair amount of time and can be very inconvenient.

To alleviate these concerns, automated sprinkler systems were developed. Such systems generally include a plurality of solenoid valves which are disposed along the conduit leading to each station. Each of the solenoid valves is connected by a conducting wire to a central controller, such as the central control unit generally indicated at 10 in FIG. 1. By supplying a current through the conducting wires, shown at 20, the central control unit 10 is able to power the solenoid valve 30 from a normally closed position into an open position. In the open position, the solenoid valve 30 allows water to all of the sprinkler heads which are down stream—i.e. within that station.

The central control unit 10 is typically attached to four to eight conducting wires 20, thus providing four to eight stations. The central control unit 10 also includes a central processor 40, which typically includes a timing mechanism 50. The central processor 40 receives power from a conductive line 60 which is typically plugged into a conventional wall electrical outlet 70.

At the appropriate time, the central processor 40 sends power to one of the solenoid valves 30a through the conducting wire 20a. The power causes the solenoid valve 30a to move from a closed position to an open position to allow water to flow therethrough. Water flowing through the solenoid valve 30a is directed to the sprinkler heads of the station and is applied to the lawn, etc. adjacent the sprinkler heads. The central processor 40 maintains power to the solenoid valve 30a for a predetermined amount of time and then stops sending power to the valve 30a through the conducting line 20a. Once the power ceases, the valve 30a closes and irrigation through that station ceases. The central processor 40 may then start irrigation through another station by sending power through conductor line 20b to valve 30b.

Such an automated system allows the user to program the sprinkling system to water the lawn at a time which is least likely to interfere with water pressure needed for household functions. Thus, for example, a sprinkling system could be programmed to water the entire lawn before the occupants of the residence awake, or after they leave for daily activities.

One problem which commonly arises with automated sprinkling systems is that a sprinkler head will break due to being stepped on, run over by a lawn mower or other similar circumstance. The damage is usually noticed once the sprinkler system is used and abnormal watering is present. Due to advances in sprinkler technology, fixing the broken sprinkler head is relatively easy and usually requires only common hand tools. However, a recurrent problem is present. To ensure that the sprinkler was tested properly, the sprinkler station must be turned on to allow water to flow through the system under normal conditions.

Because the central control unit 10 of the automated sprinkler control system controls actuation of the solenoid valves 30, the user must typically walk back to the central control unit to actuate the solenoid valve for the appropriate station. In most homes, the central control unit 10 is disposed in the garage or in the basement.

On a very small lot, the inconvenience required to leave the sprinkler head being repaired, to walk to the garage to actuate the sprinkler station and to return to the sight of the repair is relatively minor. This is, of course, except for those situations in which the sprinkler being repaired in on the opposing side of the sprinkler station from the garage. In such situations, the user must occasionally run through the sprinkler station to actuate or turn off the central controller.

Of course, the inconvenience increases in situations where several attempts are necessary to properly repair the damaged sprinkler, or to locate which of several sprinklers is damaged. In such a scenario, even a short distance between the sprinkler and the central controller can waste time and water.

The inconvenience involved with returning to the central control unit 10 is at its greatest on large pieces of property. In some cases, the user must walk forty or fifty yards to activate the sprinklers via the central control unit, and then immediately return to the sight of the repair. If the sprinkler is not properly repaired, the user must then walk back to central controller to stop water flow before any additional work is done on the sprinkler. In the mean time, the water flowing out of the sprinkler could cause soil erosion around the sprinkler, or may cause puddling or other problems which further complicate the repair process.

To remedy these concerns, there is a need for a mechanism which enables the user to control water flow to a sprinkler station from a remote location. Such a mechanism should preferably be adaptable to existing automatic sprinkler systems so as to enable remote control of the electrical signals being provided to the solenoid valves. Such a mechanism should also be configured to prevent interference with the normal functioning of the central control unit.

SUMMARY OF THE INVENTION

Thus, it is an object of the present invention to provide an improved system for actuating sprinkler stations of an automatic sprinkler control system from a remote location.

It is another object of the present invention to provide such a system which enables the user to monitor a repaired sprinkler head or conduit while actuating the station and/or terminating water flow to the station.

It is yet another object of the present invention to provide such a system which prevents feedback to the central processor when the system is in use, and thereby prevents damage to the central processor.

It is yet another object of the present invention to provide such a system which is both easy to install and easy to use.

The above and other objects of the invention are realized in specific illustrated embodiments of a remote control sprinkler control system including a remote processor disposable in communication with a power source, at least one remote conductor line for communication with the conductor lines of an automatic sprinkler system so as to enable the remote processor to power conductor lines of the automatic sprinkler system, and a remote communication mechanism for communicating with the remote processor.

In accordance with one aspect of the invention, the remote processor includes a plurality of conductor lines which may be attached to the conductor lines of the automatic sprinkler system to enable remote powering of the conductor lines of the automatic sprinkler system and thereby allows the user to cycle through the stations, or to choose any desired station for actuation.

In accordance with another aspect of the invention, the remote processor and the conductor lines connected thereto are configured to enable powering of the conductor lines of the automatic sprinkler system while the central processor of the automatic sprinkler system is turned off. Thus, the remote processor is able to selectively actuate the stations of the automatic sprinkler system while minimizing or preventing feedback to the central processor. This, in turn, minimizes risks to the central processor due to power surges and the like.

In accordance with another aspect of the present invention, the remote communication mechanism is a hand held transmitter with one or more touch keys. When the one or more touch keys are pressed, they selectively power conductor lines of the automatic sprinkler system. In a simplified embodiment of the invention, the transmitter can have a single touch key. Each pressing of the touch key causes the remote processor to actuate the next sprinkler station. Thus, the user need merely press the touch key a sufficient number of times to cycle through the sprinkler stations until the desired sprinkler station is actuated. To turn the automatic sprinkler system off, the user continues pressing the touch key once after the remote processor has actuated the last sprinkler station.

In another embodiment of the invention, the hand held transmitter is provided with a plurality of touch keys— preferably one for each sprinkler station. When the user desires to actuate the sprinklers of a particular station, he or she need only press the touch key which is associated with that station and the solenoid valve on that station is opened without the need to cycle through the other sprinkler stations. Once the test, etc., is complete, the sprinkler station can be closed by once again pressing the same touch key.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
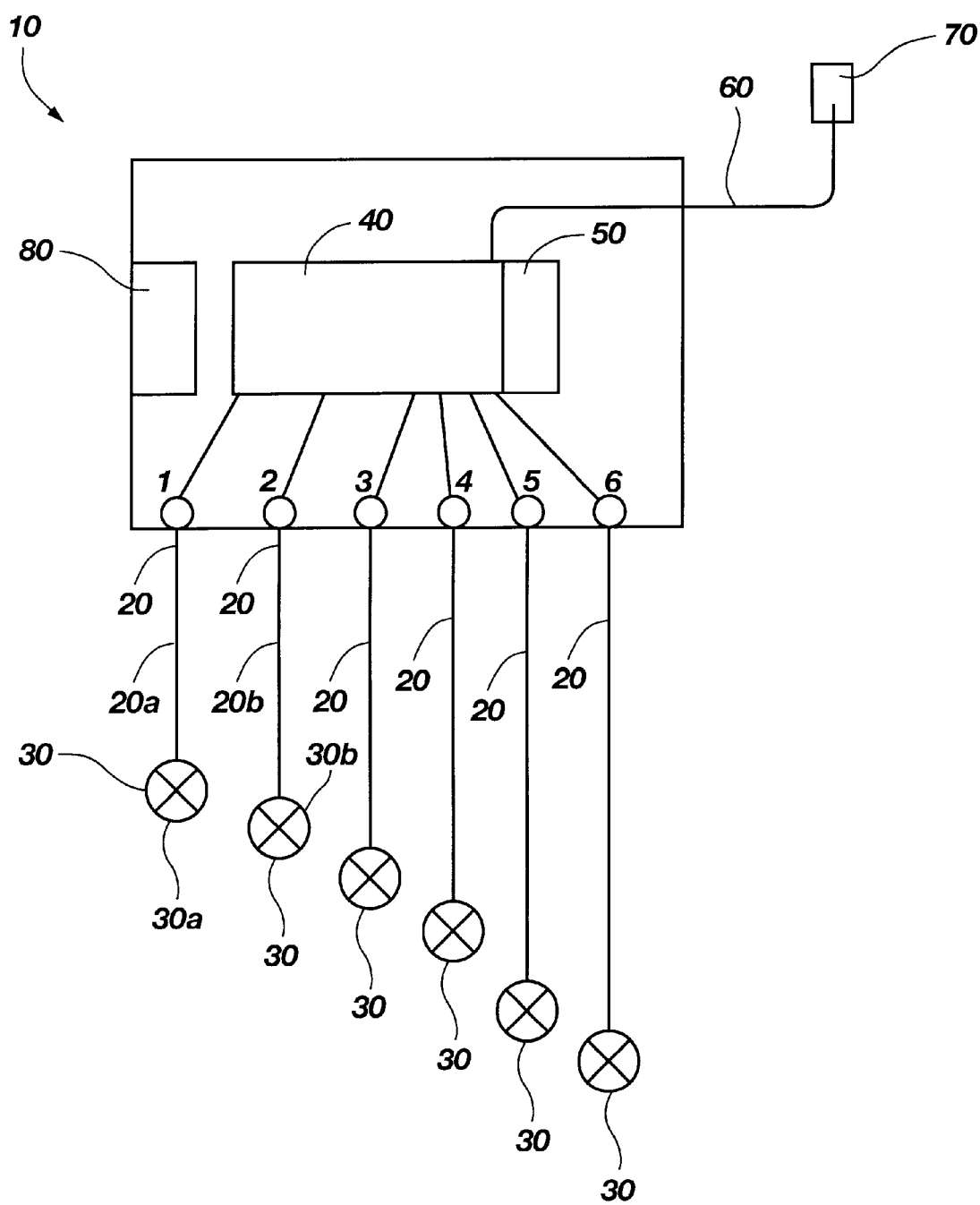
FIG. 1 is a diagram of an automatic sprinkler control system including a central processor, a plurality of solenoid valves, and conducting wires for connecting the central processor and the solenoid valves in accordance with the teachings of the prior art.

Referring again momentarily to FIG. 1, there is shown a diagram of the control mechanisms of a prior art automatic sprinkler system, generally indicated at 4. The central control unit 10 provides power through the conductor lines 20 (hereinafter referred to as the central conductor lines) to the solenoid valves 30 which are disposed along the conduits (not shown) carrying water to the sprinkler heads so as to define sprinkler stations. If the user desires to turn a station on or off, he or she must use a keypad 80 or other data entry device to actuate the desired sprinkler station. However, repeatedly returning to the sprinkler control unit 10 wastes a considerable amount of time and can cause damage to the lawn, etc., if there is a major brake in a sprinkler head or portion of the conduit. Thus, the present invention provides a mechanism to allow remote control of the stations of the automatic sprinkler control system.

Figure 2:
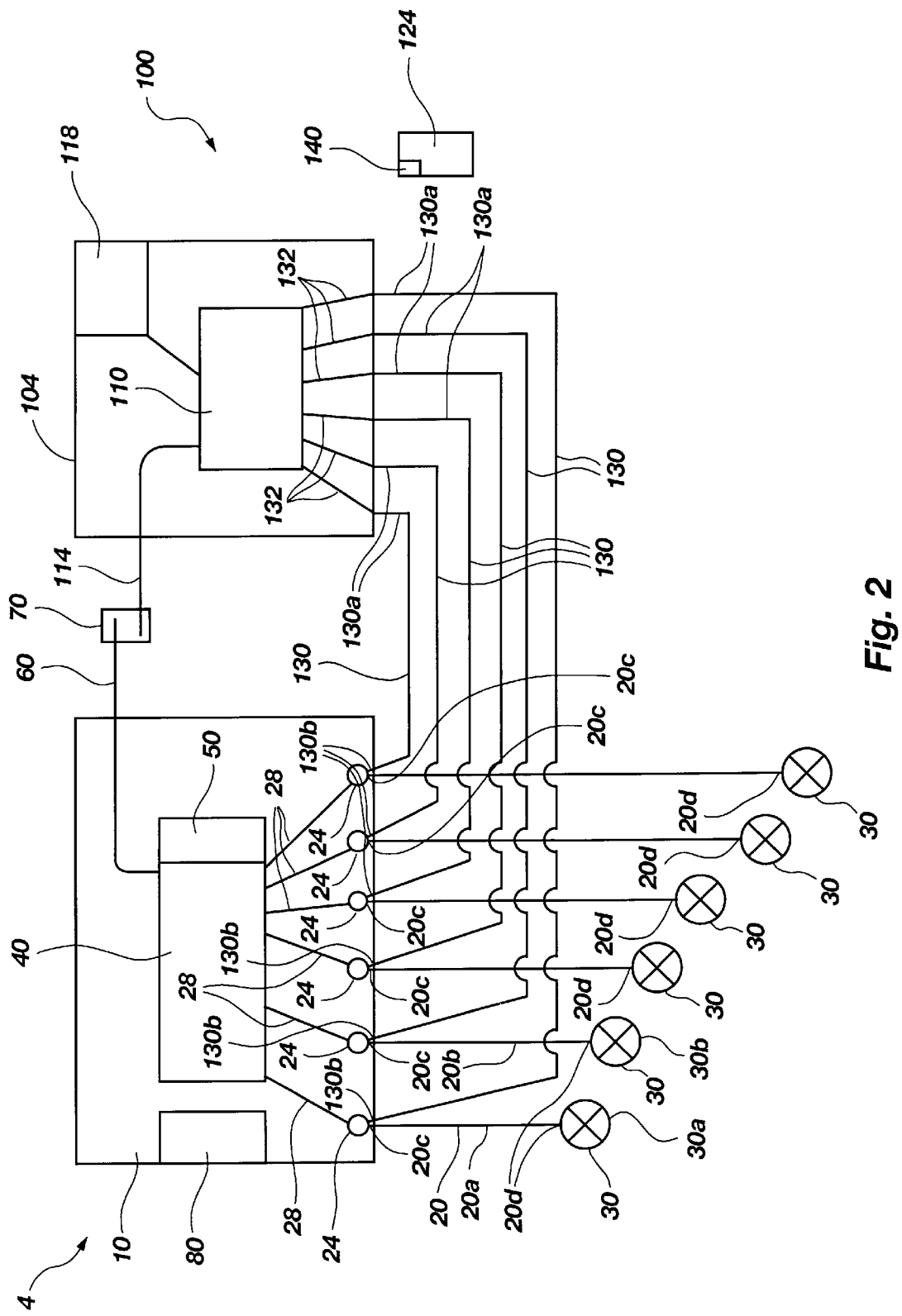
FIG. 2 is a diagram of an automatic sprinkler control system made in accordance with the present invention.

Turning now to FIG. 2, there is shown a diagram of an automatic sprinkler system of the prior art, and a remote control sprinkler control system formed in accordance with the principles of the present invention. The automatic sprinkler system, generally indicated at 4, includes a central control unit 10 and a plurality of central conductor lines 20 which are attached at a first end 20c to the central control unit. Typically, the connection between the central conductor lines 20 and the central control unit 10 is made by a conductive screw 24. The first end 20c of the central conductor lines 20 typically wraps around the screw which threadedly engages a conductor 28 in the central control unit 10.

An opposing end 20d of each of the central conductor lines 20 is attached to a valve 30. Typically, the valves 30 are solenoid valves configured such that when power is maintained through one of the central conductor lines 20, the valve 30 which is associated with that conductor line opens. opening of the valve 30 allows water to flow to the sprinkler station (not shown) which is downstream from that valve. Once the power through the central conductor line 20 is terminated, the solenoid valve 30 closes. Thus, the valves 30 are in a fail closed configuration.

The central processor 40 and a timing mechanism 50 control when each of the central conductor lines 20 is powered to open the respective valves. Power to the central processor 40 is provided by a power line 60 which connects to conventional outlet 70. If changes to the timing of the sprinklers are desired, a keypad 80 or other data entry method is used to modify the operational timing and sequencing of the system.

Disposed adjacent to the central control unit 10 is a remote control unit, generally indicated at 100. The remote control system 100 is configured to enable the user to control the functions of the sprinklers independent of the central processor 40, and from a remote location. The remote control system 100 includes a remote unit 104, which contains a remote processor 110. The remote processor 110 is powered by a power line 114. For reasons which will be discussed in detail below, it is preferable for the power line to be plugged into the same wall outlet 70 as is used by the central processor 40 of the central control unit 10.

Figure 4:
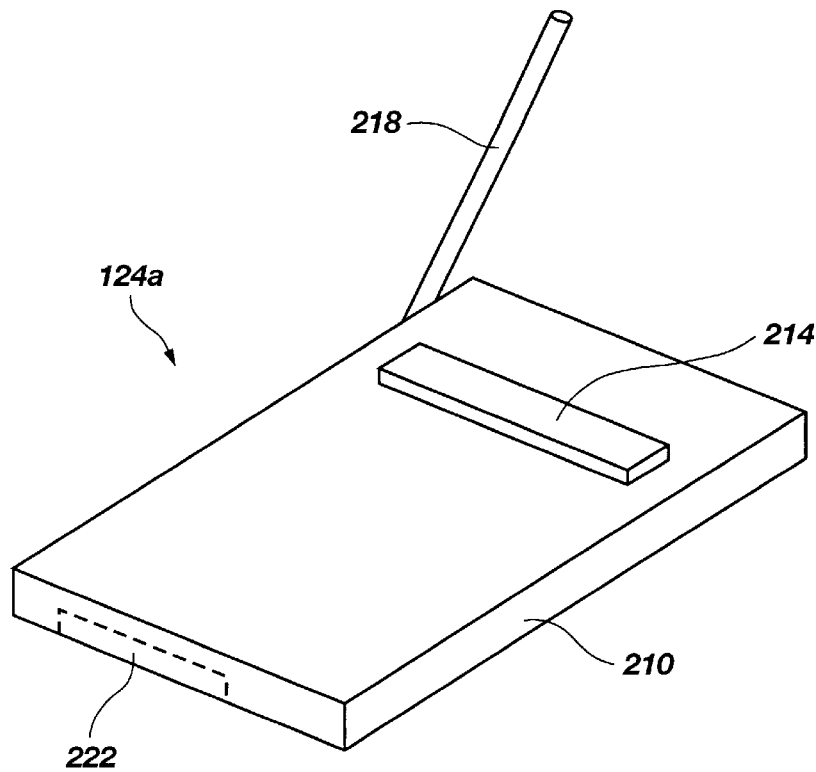
FIG. 4 is a perspective view of a remote communication mechanism made in accordance with the principles of the present invention.
Figure 5:
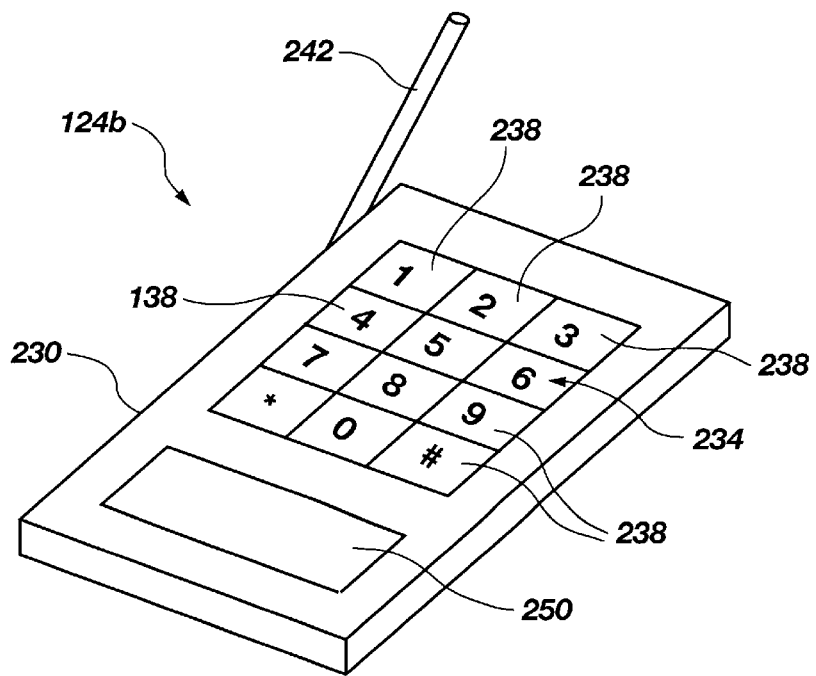
FIG. 5 shows a perspective view of an alternate embodiment of a remote communication mechanism in accordance with the present invention.

The remote processor 110 is disposed in communication with a receiver 118 which receives signals from a remote communication means 124 which is discussed in detail in FIGS. 4 and 5. The remote communication means 124 and the receiver 118 allows for remote control of the remote processor 110 to thereby enable remote control of actuation of the various sprinkler stations.

The remote processor 110 is also disposed in communication with a plurality of conductor lines 130 (hereinafter referred to as remote conductor lines). The remote conductor lines 130 are attached to conductors 132 of the remote processor 110 at a first end 130a, and are configured at a second end 130b for attachment to the screws 24 of the central control unit 4.

In use, the remote conductor lines 130 of the remote processor 110 are configured to carry power to the central conductor lines 20 to thereby actuate the solenoid valves 30 independent of the central processor 40. Preferably, the central processor 40 is turned off prior to use of the remote processor 110. By turning off the central processor 40, there is a reduced likelihood that the central processor 40 may be damaged by feedback from the power supplied by the remote processor 110 through the remote conductor lines 130 and the central conductor lines 20.

To use the remote processor 110, one or more of the conductor lines 130 are disposed in electrical communication with the central conductor lines 20 extending from the central processor 40. Typically, this will be accomplished by attaching the remote conductor lines 130 to the screws 24 which anchor the central conductor lines 20. Attachment may be made by clips, such as that shown in FIG. 3, or by conventional adapters.

Once the remote conductor lines 130 are attached to the central conductor lines 20 and the power line 114 is plugged into the wall electrical outlet 70, the remote processor 110 is ready for use. A signal is sent from the remote control means 124 through a transmitter 140 contained therein. The signal is received by the receiver 118 and passed to the remote processor 110. The remote processor 110 interprets the signal received from the remote control means 124, and selectively provides power to one the remote conductor lines 130. The power is conveyed through the remote conductor line 130 and passed to the central conductor line 20 to which the remote conductor line is attached. The power is conveyed to the solenoid valve 30 disposed at the end of the central conductor line 20, thereby opening the valve. The valve 30 will remain open as long as power is supplied by the remote processor 110 through the remote conductor line 130 and the central conductor line 20. Once power is terminated through the central conductor line 20 and the remote conductor line 130, the solenoid valve 30 will automatically close.

By using the remote control means 124, the user is able to actuate the valve controlling any particular station while standing adjacent that station. Thus, the user is able to more rapidly determine the location of a broken sprinkler head or conduit. Additionally, the user is better able to test repairs without repeatedly returning to the central control unit. For example, if a user were to walk onto his or her back lawn and notice puddling on the lawn, the user may know that, due to the location of the puddle, a sprinkler was broken in either station 1 or station 2.

Without the remote control system 100 of the present invention, the user would have to return to the garage, turn the automatic sprinkler system 4 into the manual mode and send power through the first central conducting line 20a to the solenoid valve 30a for the first station. The user must then walk back to the location of the first station's sprinkler heads and look for any malfunction which may be causing the puddling. If a problem is not observed, the user must then return to the garage and modify the central control unit 10 so that power is supplied to the second central conductor 20b and the second solenoid valve 30b. The user must then return to the location of the second sprinkler station and look for any malfunctioning sprinkler heads, etc.

If the defective part is observed, the user must then return to the garage to terminate the power and thereby close the second sprinkler station. The user must then return to the second sprinkler station to fix the defective part. Once fixed, the user must return to the garage to activate the second solenoid valve 30b again. The user must then return to the second sprinkler station to ensure that the repaired part is functioning properly, and then terminate water flow to the second sprinkler station. As will be appreciated, on a large piece of property the time spent walking between the sprinkler station and the central control unit 10 of the automatic sprinkler system can be more than the time required to make the actual repair. Similar time problems are raised by those who install sprinkler systems, as they must test each station once the installation has been completed.

The present invention solves these concerns by providing a remote control system 100 which avoids the numerous trips to the central control unit 10. Specifically, under the scenario discussed above, the user would preferably make a first trip to the central control unit 10. The remote conductor lines 130 would be connected to the central conductor lines 20, the central control unit 10 would be turned off and the remote control system 100 would be plugged into the wall outlet 70. Of course, a user could leave the remote control system 100 plugged in and the remote conductor lines 130 attached to the central control lines 20. While such would save the initial trip to the central control unit 10, it increases the chance the central processor 40 could be damaged by feedback from the remote conductor lines 130. Plugging the central control unit 10 and the remote control system 100 into the same outlet 70 helps to avoid such problems by eliminating the risk of power damage caused by the alternating current being out of phase.

Once the remote control system 100 is plugged in and the remote conductor lines 130 are attached to the central conductor lines 20, the user need merely carry the remote control means 124 to the first station. The user presses a touch key (not shown in FIG. 2) on the remote control means 124. The remote control means sends a signal through the transmitter 140 to the receiver 118 of the remote control system 100. The receiver 118 conveys the signal to the remote processor 110. The remote processor 110, in turn, provides power through the remote conductor line 130a and the central conductor line 20a to open the solenoid valve 30a.

Without leaving the first sprinkler station, the user is able to observe if there are any defective sprinkler heads, etc. By pressing the touch key again, the user sends another signal through the transmitter 140 to the receiver 118, which communicates with the remote processor 110. The second signal causes the remote processor 110 to terminate power being supplied to the remote conductor line 130a and the central conductor line 20a. Without power, the solenoid valve 30a closes, terminating water flow to the first station.

Terminating the power to the solenoid 30a can be accomplished in two different ways depending on the sophistication of the device. In a simplified version, each signal from the remote control means 124 causes the remote processor 110 to supply power to the next remote conductor line 130. Thus, as shown in FIG. 2, sending a second signal to the remote processor 110 causes the remote processor to terminate power to remote conducting line 130a and to send power to the next remote conducting line 130b. Therefore, each use of the remote control means 124 simply advances water flow to the next station. After each station has been activated, the next use of the remote control means causes the remote processor to provide power to none of the remote conductor lines 130. The cycle may then be repeated.

In more sophisticated versions of the remote control means 124 and the remote processor means 110, the user can selectively use the remote control means 124 to turn on and terminate power to any one of the stations without requiring any of the other stations to be activated. Those familiar with automatic sprinkler control systems will appreciate the different circuitries which are available or which may be constructed to accomplish such tasks.

Referring again to the above example, if the user discovers a malfunctioning sprinkler head in the first station, he or she terminates power to the valve 30a and proceeds to repair the defective device. Once the repair has been completed, the remote control means 124 is again used to cause the remote processor 110 to send power through the remote conductor line 130a and the central conductor line 20a. The power causes the valve 30a to open, and allows the user to determine if the repair was effective without requiring the user to leave the station.

If the user does not discover a malfunctioning sprinkler head in the first station, he or she can activate the second station to determine if there is a defective sprinkler at that location. While checking two stations would require four or five trips back to the central control unit 10 with a conventional automatic sprinkler system 4, the present invention allows everything to be done while standing adjacent the stations being tested. Such a system is particularly beneficial when adjusting sprinkler heads to obtain optimal irrigation patterns. Numerous adjustments can be made without leaving the vicinity of the sprinklers.

Figure 3:
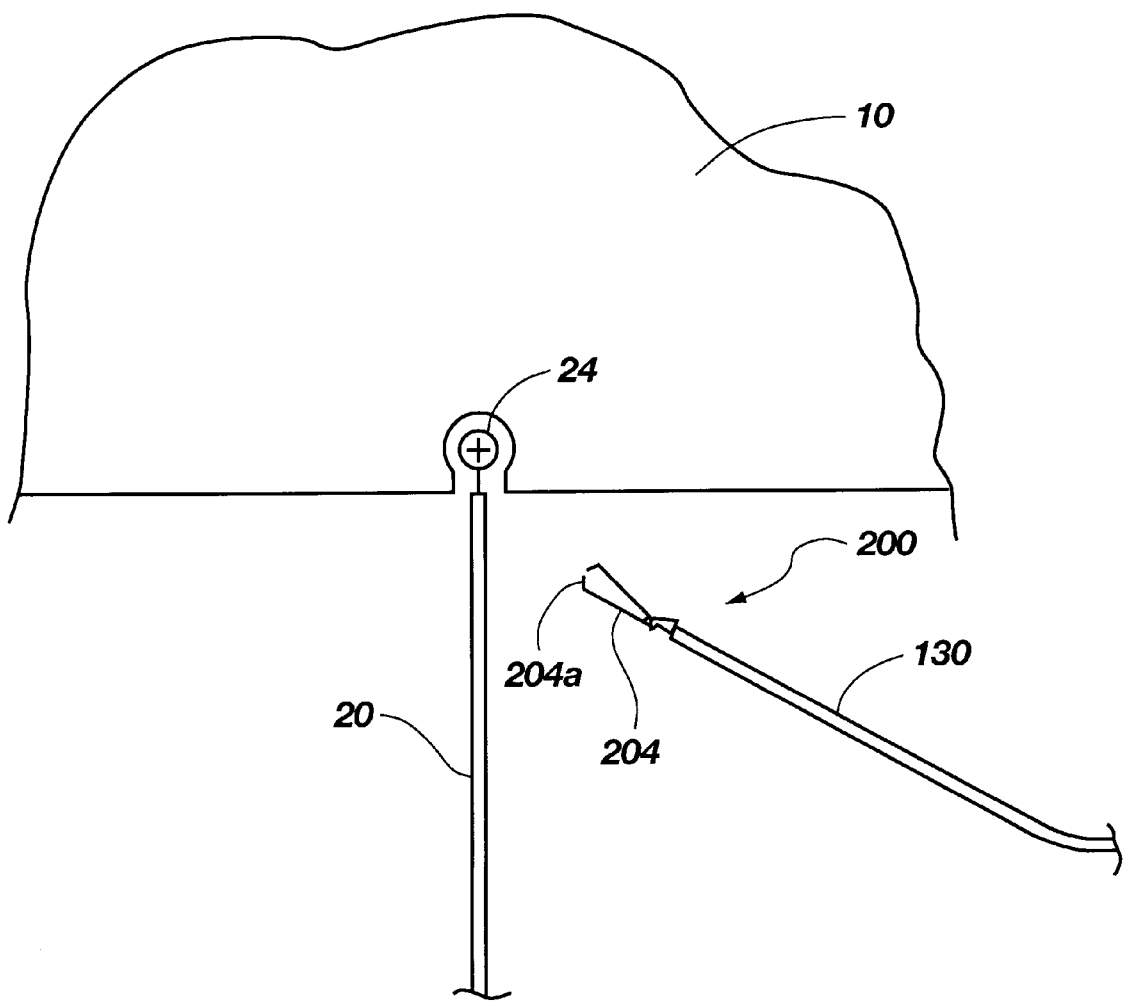
FIG. 3 shows a close-up view of a connector as might be used to connect the conductor lines of the remote processor to the conductor lines of the automatic sprinkler system.

In use, the circuitry associated with the remote processor 110 processes the 120 vac power received from the power outlet 70 into a 24 vac with sufficient current to provide approximately 0.3 amps inrush and 0.19 amps holding current. These currents are sufficient, respectively, to actuate movement of the solenoid valves 30 and to maintain the valves in an open configuration Turning now to FIG. 3, there is shown a close-up view of a connector, generally indicated at 200. The central conductor lines 20 (only one of which is shown in FIG. 3) are attached to the central control unit 10 by the screw 24. Thus, by attaching the remote conductor lines 130 (only one of which is shown in FIG. 3) to the screw 24, the remote conductor lines are disposed in electrical communication with the central conductor lines 20.

To facilitate ease of attachment to the screw 24, the remote conductor lines 130 may be provided with a connector 200 in the form of a spring biased clip 204. Squeezing the clip 204 slightly allows a distal end 204a of the clip to open sufficiently to fit over the head of the screw 24. Releasing the clip 204 causes the clip to grip the screw 24 and places the remote conductor line 130 in electrical communication with the central conductor line 20. Once the remote control system 100 is no longer needed, the clip 204 can be easily removed by simply squeezing the clip and pulling away from the screw 24.

The ease of attachment provided above is ideal for several applications. For the typical home owner, the connector 204 allows for easy disconnection of the remote conductor lines 130, and thus encourages removal of the remote conductor lines when the remote control system 100 is no longer needed. Thus, the user is encouraged to terminate the connection and prevent electrical feedback during use of the automatic sprinkler system 4.

For commercial applications, the ease of attachment and removal of the remote control system 100 is particularly beneficial. For example, those installing sprinkler systems can take the remote control system to each installation job. Once the initial installation is completed, the remote control system 100 can be attached in less then two minutes and allows full testing of the system. Once the newly installed sprinkler system has been tested, the remote control system 100 can be removed in an equally short amount of time.

Turning now to FIG. 4 there is shown a perspective view of a simplified version of the remote control means, indicated as 124a. The remote control means 124a includes a housing 210 configured for being holdable in one's hand. Disposed in communication with the housing is a touch key 214 which may be pressed by the user. When the touch key 214 is pressed, a transmitter in the housing (such as transmitter 140 in FIG. 2) sends a signal through an antenna 218 to the receiver 118 (FIG. 2). While the antenna 218 could be housed within the housing, a longer antenna is preferable to ensure proper transmitting even on large pieces of property.

In using the remote control means 124a shown in FIG. 4, the user would simply press the touch key 214 repeatedly to cycle through the stations until reaching the station desired. Thus, if station six of an eight station automatic sprinkler control system 4 needed to be actuated to check for a damaged sprinkler, the user would press the touch key 214 six times to cycle through to the sixth station. The processor means 110 would send the appropriate power to the solenoid valve 30 (FIG. 2) associated with the sixth sprinkler station. Once finished, the touch key would be pressed three more times to cycle through the seventh and eighth stations, and to return to the off position.

The remote control means 124*a* will typically be powered by conventional batteries—typically a pair of AA batteries. The batteries can be placed within the housing through a small door 222 on one end thereof.

Turning now to FIG. 5, there is shown yet another embodiment of a remote control means, generally indicated at 124*b*. The remote control means 124*b* includes a housing 230 and a touch pad 234 in the form of a plurality of touch keys 238. Preferably, there will be at least 8 touch keys, and more preferably at least 10. The touch keys 238 can be used to activate the valve 30 of a particular sprinkler station without requiring the remote processor to cycle through any other stations. Thus, for example, if a sprinkler head in station six was potential defective, the sprinklers of station six could be turned on and off without affecting any of the other sprinkler stations.

Once the user presses a desired station number and an enter key (i.e. the # sign), transmitter inside the housing 230 would send a signal through the antenna 242 to the receiver 118 (FIG. 2) to the remote processor 110 (FIG. 2). The remote processor 110 would power the appropriate remote conductor line 130 and central conductor line 20 to actuate the appropriate valve. Pressing the same touch key 238 again and hitting the enter key would cause the remote processor 110 to terminate power to the valve and thereby terminate flow.

The same remote control means 124*b* could also be utilized with a more advanced remote processor to control a much larger number of stations. For example, while a typical yard may have only six or eight stations, a large park or golf course could easily have as many as seventy or even one hundred sprinkler stations. By selecting a combination of two numbers, the user of the remote control means 124*b* of FIG. 5 could activate 100 stations from the touch pad 234. Thus, the grounds crew of a golf course could selectively activate any sprinkler station required while on the course. By avoiding having to return to the central control unit to turn the stations on or off, considerable time can be saved.

To further facilitate use of the system 100, a display screen 250 could be disposed in the housing. The display screen 250 would let the user see what station had been entered. When working with a large number of stations, an indicator of which stations are active would be very beneficial. Thus, the number of the last entered sprinkler station may be retained on the display screen to assist the user.

Figure 6:
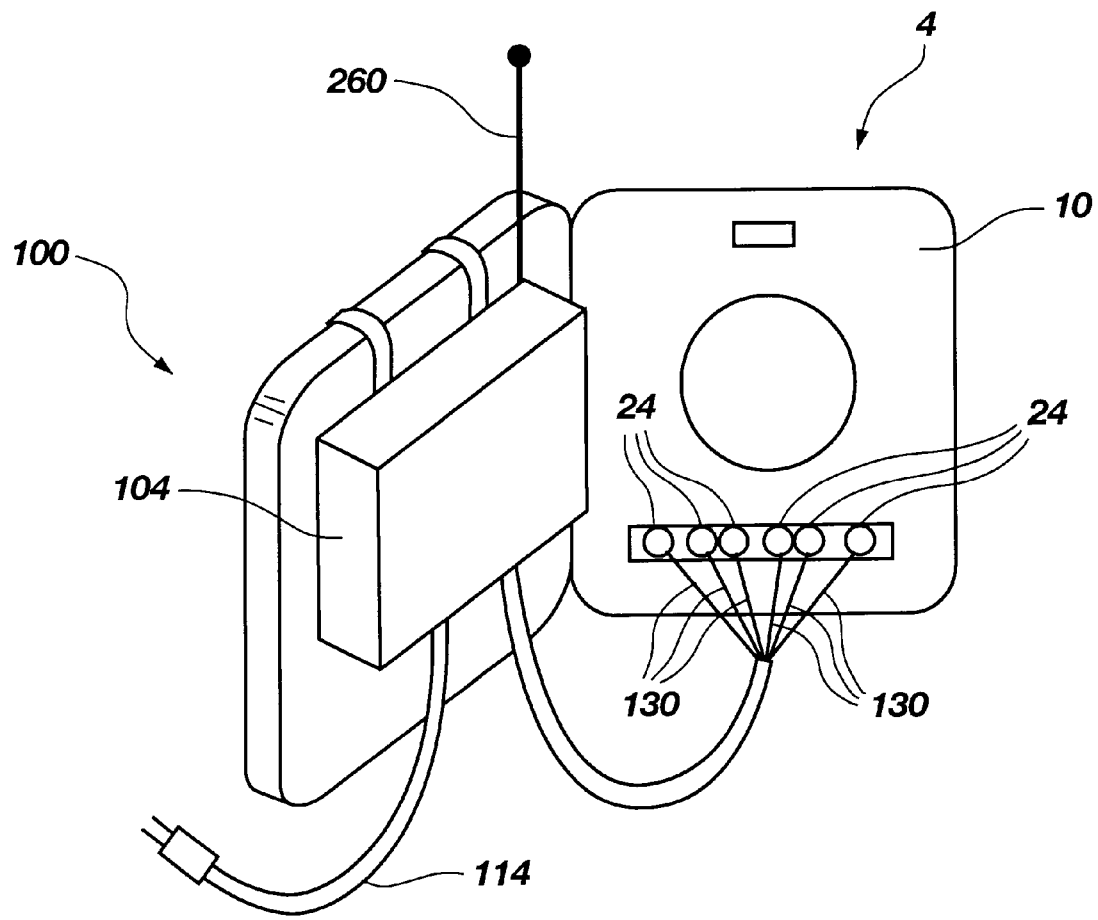
FIG. 6 shows a perspective view of the remote processor mechanism and the central control of the an automatic sprinkler control system.

Turning now to FIG. 6, there is shown a perspective view of the remote processor housing 104 and the central control unit 10 of an automatic sprinkler control system 4. The remote control system 100 includes the power line 114, and the remote conductor lines 130 which connect the screws 24 of the central control unit 10 to the remote processor (not visible).

Also shown in FIG. 6 is an antenna 260 which extends from the remote control system housing 104 to receive signals from the remote control means 124 (not shown in FIG. 6). When a signal is received from the remote control means 124, the remote processor sends power through the remote conductor lines 130 to provide power to the valves 30 (not shown in FIG. 6) which control water flow through the sprinkler system. Once the remote control system 100 is no longer needed, the remote conductor lines 130 are simply removed from the screws 24.

Thus there is disclosed an improved remote control system 100 for automatic sprinkler control systems. Those skilled in the art will appreciate numerous modifications which can be made without departing from the scope and spirit of the present invention. The appended claims are intended to cover such modifications.

What is claimed is:

1. A method for remotely controlling an automatic sprinkler control system having a processor, a plurality of conductor means disposed in electrical communication with the processor, and a plurality of valves, each valve being disposed in electrical communication with one of the conductor lines such that when the processor sends electrical power through the conductor line, the valve associated with that line is open, the method comprising:
   (a) providing a remote control system having at least one remote conductor line, a remote processor, a remote control means, and a power line independent of the automatic sprinkler control system;
   (b) attaching at least one remote conductor line to one of the conductors of the automatic sprinkler control system; and
   (c) actuating the remote processor to supply electrical energy through the at least one remote conductor and one of the conductors of the automatic sprinkler control system to open the valve associated with said conductor of the automatic sprinkler control system.

2. The method according to claim 1, wherein the method further comprises actuating the remote processor by sending a signal from the remote control means.

3. The method according to claim 1, wherein the method comprises, more specifically, providing a plurality of remote conductor lines, each being in electrical communication with the remote processor, and attaching each of the remote conductors to a conductor of the automatic sprinkler control system.

4. The method according to claim 3, wherein the method further comprises using the remote control means to control the remote processor and thereby select to which remote conductor lines power is supplied.

5. The method according to claim 1, wherein the remote control means comprises at least one touch key, and wherein the method comprises using the at least one touch key to control the remote processor, and thereby send power to the at least one remote conductor line.

6. The method according to claim 1, wherein the conductor lines of the automatic sprinkler control each control a station of sprinkler heads, wherein the at least one remote conductor line comprises a plurality of remote conductor lines, each being disposed in electrical communication with a conductor line of the automatic sprinkler control station independent of the processor of the automatic sprinkler control system, and wherein the method further comprises cycling through the sprinkler stations by repeatedly actuating the remote control means.

7. The method according to claim 1, wherein the conductor lines of the automatic sprinkler control each control a station of sprinkler heads, wherein the at least one remote conductor line comprises a plurality of remote conductor lines, each being disposed in electrical communication with a conductor line of the automatic sprinkler control station, and wherein the method further comprises selectively activating a desired sprinkler station by actuating the remote control means and thereby causing power to flow through one of the remote conductor lines.

8. The method according to claim 7, wherein the remote control means comprises a housing with a plurality of touch keys disposed thereon, and wherein the method comprises selecting a touch key associated with a desired sprinkler station.

9. The method according to claim 1, wherein the method comprises, more specifically, utilizing the remote control system while the processor of the automatic sprinkler system is off.

10. A remote control system for remotely operating an automatic sprinkler control system having a processor means, a plurality of valves and a plurality of conductors operationally connecting the processor means and the valves, the remote control system comprising:

a plurality of remote conductor lines attachable to at least one conductor of the automatic sprinkler control system;

a remote processor disposed in communication with the remote conductor lines for selectively supplying power to one or more of the conductors through the at least one remote conductor; and remote control means in communication with the remote processor for controlling the remote processor to selectively apply power to at least one of the at least one remote conductor lines; and wherein the plurality of remote conductor lines each further comprise a clip means for attachment to the conductors of the automatic sprinkler control system so as to place the remote conductor lines in electrical contact with the conductor lines of the automatic sprinkler control system.

11. A remote control system for attachment to an automatic sprinkler control system having a processor, a plurality of valves and a plurality of conductors for communicating electricity between the processor and the plurality of valves, the remote control system comprising:

a plurality of remote conductor lines for carrying electrical energy, the remote conductor lines having a means for attachment to the conductors of the automatic sprinkler control system;

a remote processor for selectively providing electrical energy to the remote conductor lines and the conductors independent of the automatic sprinkler control system; and a remote control means for controlling the remote processor and for selecting which of the remote conductor lines receives power.

12. A remote control system for remotely operating an automatic sprinkler control system having a processor means, a plurality of valves and a plurality of conductors operationally connecting the processor means and the valves, the remote control system comprising:

at least one remote conductor line disposable in communication with at least one conductor of the automatic sprinkler control system;

a remote processor disposed in communication with the at least one remote conductor for selectively supplying power to one or more of the conductors through the at least one remote conductor independent of the processor means of the automatic sprinkler control system;

a power supply for supplying power to the remote processor and remote conductor line independent of the automatic sprinkler control system; and remote control means in communication with the remote processor for controlling the remote processor to selectively apply power to at least one of the at least one remote conductor lines.

13. A remote control system for remotely operating an automatic sprinkler control system having a processor means, a plurality of valves and a plurality of conductors operationally connecting the processor means and the valves, the remote control system comprising:

at least one remote conductor line disposable in communication with at least one conductor of the automatic sprinkler control system;

a remote processor disposed in communication with the at least one remote conductor for selectively supplying power to one or more of the conductors through the at least one remote conductor independent of the processor means of the automatic sprinkler control system; and remote control means in communication with the remote processor for controlling the remote processor to selectively apply power to at least one of the at least one remote conductor lines.

14. The remote control system according to claim 13, wherein the automatic sprinkler system operates on 120 vac and wherein the remote control system operates on 120 vac.

15. The remote control system according to claim 13, wherein the at least one remote conductor line comprises a plurality of remote conductor lines, each of said remote conductor lines being disposable in electrical communication with a conductor of the automatic sprinkler control system.

16. The remote control system of claim 15, wherein the automatic sprinkler control system comprises a plurality of screws for anchoring the conductor lines of the automatic sprinkler control system, and wherein the plurality of remote conductor lines each comprise attachment means for attachment to the screws.

17. The remote control system of claim 13, further comprising a transmitter disposed in the remote control means and a receiver disposed in communication with the remote processor.

18. The remote control system of claim 13, wherein the at least one remote conductor line comprises a plurality of conductor lines, and wherein the remote control means comprises data input means for selectively actuating the remote processor to provide power to a selected one of the remote conductor lines.

19. The remote control system of claim 18, wherein the data entry means comprises at least one touch key.

20. The remote control system of claim 19, wherein the data entry means comprises a plurality of touch keys, each key being configured to actuate the remote processor to provide power to a different remote conductor line.

21. The remote control processor of claim 13, wherein the remote processor is configured to provide sufficient power through the at least one remote conductor line and the conductor line of the automatic sprinkler control system to independently actuate a valve attached to a conductor line of the automatic sprinkler control system.

22. The remote control processor of claim 13, wherein the remote control means comprises a housing, and means for wireless communication between the housing and the remote processor when the remote processor is disposed in a remote location from the housing.

* * * * *